US012150611B2

(12) United States Patent
Du et al.

(10) Patent No.: US 12,150,611 B2
(45) Date of Patent: Nov. 26, 2024

(54) CLEANING DEVICE, CLEANING METHOD THEREOF, AND CLEANING MACHINE SYSTEM

(71) Applicant: SHENZHEN FLY RODENT DYNAMICS INTELLIGENT TECHNOLOGY CO., LTD., Shenzhen (CN)

(72) Inventors: Pan Du, Shenzhen (CN); Linlin Zhou, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 376 days.

(21) Appl. No.: 17/643,492

(22) Filed: Dec. 9, 2021

(65) Prior Publication Data

US 2022/0304543 A1 Sep. 29, 2022

(30) Foreign Application Priority Data

Mar. 23, 2021 (CN) ......................... 202110308142.4

(51) Int. Cl.
*A47L 13/502* (2006.01)
*A47L 11/284* (2006.01)
(Continued)

(52) U.S. Cl.
CPC ........... *A47L 13/502* (2013.01); *A47L 11/284* (2013.01); *A47L 11/4052* (2013.01);
(Continued)

(58) Field of Classification Search
CPC ........... A47L 2201/02; A47L 2201/028; A47L 11/20; A47L 11/28; A47L 11/284;
(Continued)

(56) References Cited

U.S. PATENT DOCUMENTS

2019/0246859 A1 8/2019 Li
2020/0406306 A1* 12/2020 Liu ......................... A47L 13/51
2024/0130597 A1* 4/2024 Sun ..................... A47L 11/4083

FOREIGN PATENT DOCUMENTS

CN 103622650 A 3/2014
CN 103720446 A 4/2014
(Continued)

OTHER PUBLICATIONS

CN112515568 WIPO Translation; Jing, Li; Floor Mopping Machine and Cleaning Device Used in Cooperation With Floor Mopping Machine; Mar. 19, 2021 (Year: 2021).*
(Continued)

*Primary Examiner* — Brian D Keller
*Assistant Examiner* — Sidney D Full
(74) *Attorney, Agent, or Firm* — Samson G. Yu

(57) ABSTRACT

The cleaning device includes a water injection member and a mopping cloth cleaning member. The water injection member is configured to wet the mopping cloth of a cleaning robot. The mopping cloth cleaning member which reciprocates up and down to flap the mopping cloth of the cleaning robot, in order to clean the mopping cloth of the cleaning robot.

13 Claims, 3 Drawing Sheets

(51) Int. Cl.
*A47L 11/40* (2006.01)
*B08B 1/00* (2024.01)
*B08B 3/00* (2006.01)

(52) U.S. Cl.
CPC .............. *A47L 11/408* (2013.01); *B08B 1/00* (2013.01); *B08B 3/00* (2013.01)

(58) Field of Classification Search
CPC A47L 11/4052; A47L 11/408; A47L 11/4091; A47L 13/502; A47L 13/58; A47L 9/2873; B08B 1/16; B08B 1/165; B08B 1/00; B08B 3/00
See application file for complete search history.

(56) References Cited

FOREIGN PATENT DOCUMENTS

| | | | |
|---|---|---|---|
| CN | 108403017 | A | 8/2018 |
| CN | 108420373 | A | 8/2018 |
| CN | 109090065 | A | 12/2018 |
| CN | 210749048 | U | 6/2020 |
| CN | 210788264 | U | 6/2020 |
| CN | 111568325 | A | 8/2020 |
| CN | 211381148 | U | 9/2020 |
| CN | 211381150 | U | 9/2020 |
| CN | 211749466 | U | 10/2020 |
| CN | 212465887 | U | 2/2021 |
| CN | 112426109 | A | 3/2021 |
| CN | 112515568 | A | 3/2021 |
| CN | 112869652 | A | 6/2021 |
| CN | 215457695 | U | 1/2022 |
| WO | 2021036025 | A1 | 3/2021 |

OTHER PUBLICATIONS

Office Action mailed to Chinese Counterpart Patent Application No. 2021103081424 on Jun. 24, 2023.

International Search Report mailed to Counterpart Patent Application No. PCT/CN2021/135578 on Mar. 15, 2022.

* cited by examiner

CLEANING DEVICE, CLEANING METHOD THEREOF, AND CLEANING MACHINE SYSTEM

CROSS-REFERENCE TO RELATED APPLICATIONS

This application is based upon and claims priority to Chinese Patent Application CN 202110308142.4, filed Mar. 23, 2021, the entire contents of which are incorporated herein by reference.

TECHNICAL FIELD

The present disclosure relates to the field of cleaning devices, and more particularly to a cleaning device, a cleaning method thereof, and a cleaning machine system.

BACKGROUND

A cleaning robot is configured to perform cleaning tasks while traveling in any area without user control, which is usually used to clean up dirt on the ground.

Currently, a cleaning device is provided to be matched with the cleaning robot in order to facilitate the cleaning of the mopping cloth of the cleaning robot. The cleaning device wets the mopping cloth of the cleaning robot through a nozzle, and scrapes the mopping cloth of the cleaning robot through the scraper, in order to clean the dust and stains on the mopping cloth of the cleaning robot. However, due to a limited force between the scraper and the mopping cloth of the cleaning robot, the stubborn stains adhered to the mopping cloth of the cleaning robot is difficult to be cleaned, which brings inconvenience to the user and affects the user experience.

SUMMARY

There are provided a cleaning device, a cleaning method and a cleaning machine system according to embodiments of the present disclosure. The technical solution is as below:

According to a first aspect of embodiments of the present disclosure, there is provided a cleaning device, comprising:

a water injection member configured to wet the mopping cloth of the cleaning robot; and a mopping cloth cleaning member reciprocating up and down to flap the mopping cloth of the cleaning robot, in order to clean the mopping cloth of the cleaning robot.

According to a second aspect of embodiments of the present disclosure, there is provided a cleaning method for a cleaning device, the cleaning device comprises a water injection member configured to wet a mopping cloth of the cleaning robot, and a mopping cloth cleaning member reciprocating up and down to flap the mopping cloth of the cleaning robot, in order to clean the mopping cloth of the cleaning robot;

the cleaning method comprises:

supplying water to the water injection member to wet the mopping cloth of the cleaning robot, when the cleaning robot is at a cleaning position of the cleaning device, and activating a driving mechanism to drive the mopping cloth cleaning member to reciprocate up and down.

According to a third aspect of embodiments of the present disclosure, there is provided a cleaning machine system, comprising:

a cleaning robot; and a cleaning device comprising:

a water injection member configured to wet the mopping cloth of the cleaning robot;

and a mopping cloth cleaning member reciprocating up and down to flap the mopping cloth of the cleaning robot, in order to clean the mopping cloth of the cleaning robot.

BRIEF DESCRIPTION OF THE DRAWINGS

To illustrate the technical solutions in the embodiments of the present disclosure or in the prior art more clearly, the accompanying drawings required for describing the embodiments or the prior art are briefly introduced below. Obviously, the drawings in the following description are merely some embodiments of the present disclosure. For those of ordinary skill in the art, other drawings can also be obtained from the structures shown in these drawings without creative efforts.

The implementation, functional features and advantages of the present disclosure will be further described with reference to the accompanying drawings.

DETAILED DESCRIPTION

Hereinafter, the technical solutions in the embodiments of the present disclosure will be described clearly and completely with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by those skilled in the art without creative efforts all belong to the protection scope of the present disclosure.

It should be noted that all directivity indications (such as up, down, left, right, front, rear and the like) in the embodiments of the present disclosure are merely used for explaining relative positional relationships and movement conditions between components in a specific attitude (as shown in the figures), and if the specific attitude changes, the directivity indications also change accordingly.

In addition, descriptions relating to “first”, “second” and the like in the present disclosure are merely used for describing the purpose, and cannot be understood to indicate or imply the relative importance thereof or implicitly specify the number of indicated technical features. Thus, the features that define “first”, “second” may indicate or implicitly include at least one such feature. In addition, the technical solutions between the embodiments may be combined with each other, but must be capable of being realized by a person of ordinary skill in the art. When the combination of the technical solutions contradicts each other or cannot be realized, it should be considered that the combination of the technical solutions does not exist, nor does it fall within the scope of protection required by the present disclosure.

Figure 1:
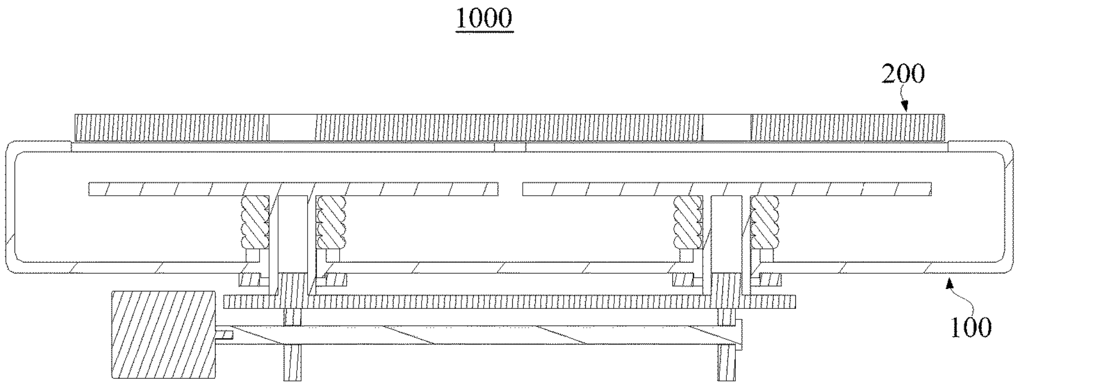
FIG. 1 is a structural view of a cleaning machine system according to an embodiment of the present disclosure.
Figure 2:
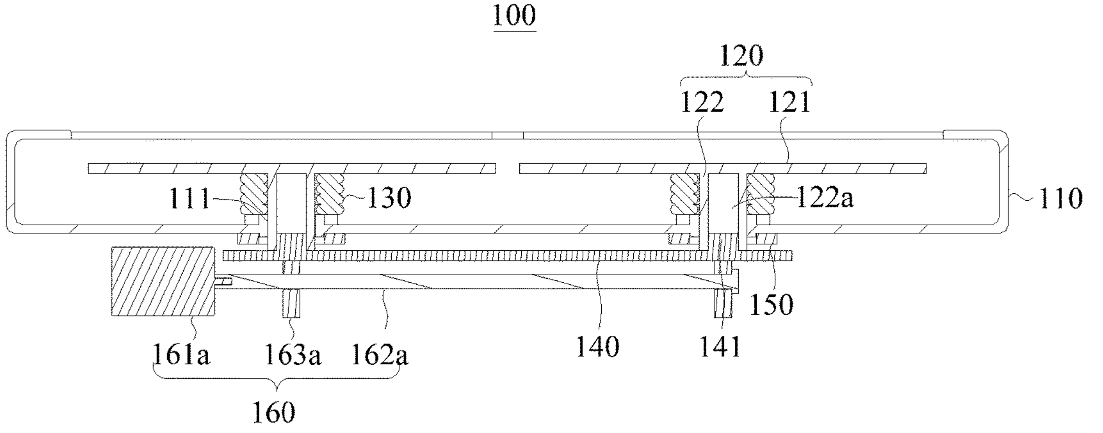
FIG. 2 is a sectional view of a cleaning device according to an embodiment of the present disclosure.
Figure 3:
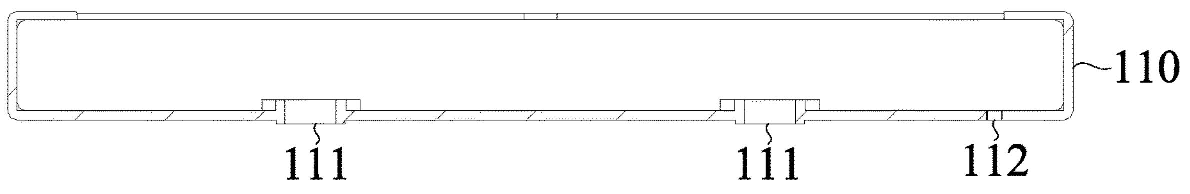
FIG. 3 is a sectional view of the water tank of FIG. 2 according to an embodiment of the present disclosure.

The present disclosure provides a cleaning device, which is used for cleaning a mopping cloth of a cleaning robot in a flat plate shape. Referring to FIGS. 1 and 2, the cleaning device 100 includes a water injection member and a mopping cloth cleaning member 120.

There are many kinds of water injection members, which may be a container structure capable of water loading, which may also be a spray head capable of water spraying, and may also be another structure capable of wetting the mopping cloth of the cleaning robot, which is not listed one by one herein.

There are many kinds of the mopping cloth cleaning member 120, which may be composed of a plate structure and a driving device capable of reciprocating straight movement, which may also be composed of a plate-like structure and a driving device capable of reciprocating movement, which may also be formed of other components, which is not be listed one by one herein.

When the cleaning device 100 in the present disclosure cleans the mopping cloth of the cleaning robot, the water injection member is used for wetting the mopping cloth of the cleaning robot. The mopping cloth cleaning member 120 reciprocates up and down to continuously flap the wet mop cleaning robot. In this way, the dust and the stains adhered to the mopping cloth of the cleaning robot, particularly the stubborn stains, are mixed into the water, and finally the cleaning robot is washed and cleaned by the water carried by the mopping cloth cleaning member 120. Therefore, the dirt on the mopping cloth, especially the dirt that is difficult to remove, can be completely cleaned, thereby ensuring the cleaning effect of the cleaning device.

In addition, after the cleaning device 100 completes the cleaning step of the mopping cloth of the cleaning robot, the mopping cloth cleaning member 120 may continue to move up and down to flap the mopping cloth of the cleaning robot, so that the water on the mopping cloth of the cleaning robot is extruded, thereby accelerating the dewatering of the mopping cloth of the cleaning robot.

In some embodiments of the present disclosure, the water injection member is a water tank 110 with an opening at the upper end, and the water tank 110 may be an independent part of the cleaning device 100. That is, the water tank 110 is formed of a container capable of containing water, and the water tank 110 may also be a part of the shell of the cleaning device 100. That is, the water tank 110 is formed by a recess on the shell of the cleaning device 100. How the water tank 110 is arranged is not specifically limited herein.

The upper end of the water tank 110 is provided with an opening, and an area of the opening of the water tank 110 is greater than or equal to an area of the mopping cloth 200 of the cleaning robot. Alternatively, the area of the opening of the water tank 110 is greater than the area of the mopping cloth 200 of the cleaning robot. Thus, it is convenient to align the mopping cloth 200 of the cleaning robot with the water tank 110.

The mopping cloth cleaning member 120 is a movable member, which may be mounted on the water tank 110, and may also be mounted on other components of the cleaning device 100, which is not specifically limited herein.

The mopping cloth cleaning member 120 may be moved up and down and extends into or out of the water tank 110, such that there is a first position where the mopping cloth cleaning member 120 extends into the water tank 110 and a second position where the mopping cloth cleaning member 120 extends out of the water tank 110 and flaps the mopping cloth 200 of the cleaning robot.

In other word, in the first position, the mopping cloth cleaning member 120 may be partially or completely submerged into the water of the water tank 110, and the water in the water tank 110 contacts the mopping cloth cleaning member 120, which can not only wet the mopping cloth cleaning member 120, but also wash the dust and stains carried by the mopping cloth cleaning member 120.

In the second position, the mopping cloth cleaning member 120 collides the mopping cloth 200 of the cleaning robot, and the wet mopping cloth cleaning member 120 not only can wet the mopping cloth 200 of the cleaning robot, but also can flap dust and stains on the mopping cloth 200 of the cleaning robot, so that the dust and stains adhered to the mopping cloth 200 of the cleaning robot, especially the stains that are difficult to clean, can be sufficiently cleaned.

It should be noted that, the mopping cloth 200 of the cleaning robot is generally a platy structure, to facilitate the mopping cloth cleaning member 120 to clean the mopping cloth 200 of the cleaning robot. In some embodiments of the present disclosure, referring to FIG. 2, the mopping cloth cleaning member 120 includes a flapping plate 121, an area of a plate surface of the flapping plate 121 is smaller than the area of the opening of the water tank 110, and the flapping plate 121 is driven by an external force to move up and down.

The flapping plate 121 has different kinds of movement in the up-down direction. In some embodiments of the present disclosure, the flapping plate 121 can move up and down along a straight line. That is, the flapping plate 121 is in a straight up-down movement. The flapping plate 121 can also move up and down along an arc, that is, the flapping plate 121 swings up and down with a position between the mopping cloth 200 of the cleaning robot and the water level of the water tank 110 as the center of the circle. The movement manner of the flapping plate 121 is not specifically limited herein.

The surface of the flapping plate 121 facing the mopping cloth 200 of the cleaning robot may be a flat plane or an uneven surface. Alternatively, the surface of the flapping plate 121 facing the mopping cloth 200 of the cleaning robot is in an uneven shape. In this way, when moving from a position in contact with water in the water tank 110 to a position in contact with the mopping cloth 200 of the cleaning robot, the flapping plate 121 carry more water to contact with the mopping cloth 200 of the cleaning robot, thereby accelerating to wet the mopping cloth 200 of the cleaning robot. Meanwhile, the mopping cloth 200 of the cleaning robot contact more water, and it is easier to flush and clean dust and stains on the mopping cloth 200 of the cleaning robot, which further contributes to improving the cleaning efficiency of the mopping cloth cleaning member 120.

The shape of the flapping plate 121 may be the same as the shape of the mopping cloth 200 of the cleaning robot, and the shape of the flapping plate 121 may also be different from the shape of the mopping cloth 200 of the cleaning robot. Alternatively the shape of the flapping plate 121 is the same as the shape of the mopping cloth 200 of the cleaning robot, that is, the mopping cloth 200 of the cleaning robot may be in a circular shape, a square shape, a U shape and other regular shapes. The shape of the flapping plate 121 is correspondingly arranged in a circular shape, a square shape, a U shape and other regular shapes. Alternatively, the mopping cloth 200 of the cleaning robot is arranged in other irregular shapes, and the flapping board 121 is correspondingly arranged in other irregular shapes. In this way, the flapping board 121 can flap the entire mopping cloth 200 of the cleaning robot every time, thereby facilitating the cleaning of the mopping cloth 200 of the cleaning robot.

It should be noted that, the power required for the up-down movement of the flapping plate 121 may be derived from a person or a driving device. However, an internal space of the water tank 110 is relatively narrow and inconvenient to operate, and at the same time, the driving device is prone to corrosion when it is in contact with water for a long time. In view of this, referring to FIG. 2, a movement channel 111 is provided throughout the water tank 110. The mopping cloth cleaning member 120 further includes a driving rod 122, one end of which is connected to the flapping plate 121. The driving rod 122 and the flapping plate 121 may be fixedly connected by screw connection, bonding, plug-in connection and other connection methods. The other end of the driving rod 122 extends through the movement channel 111 to the outside of the water tank 110. In this way, an external force may be applied to the flapping plate 121 outside the water tank 110, which facilitates driving the flapping plate 121 to move up and down, particularly when the flapping plate 121 is driven by a driving device. The driving device may be mounted outside the water tank 110, so that the problem that the driving device contacts water for a long time can also be avoided.

It should be noted that the location of the movement channel 111 is related to the movement manner of the flapping plate 121. If the flapping plate 121 moves up and down in a straight line, the movement channel 111 is opened at the bottom of the water tank 110. If the flapping plate 121 moves up and down in an arc, the movement channel 111 is opened on the wall of the water tank 110. The specific location of the movement channel 111 is not limited herein.

To deserve to be mentioned, the driving rod 122 can move relative to the movement channel 111, that is, there is a gap between the driving rod 122 and the movement channel 111, so the water may flow out between the inner wall of the movement channel 111 and the driving rod 122 when the water level in the water tank 110 is higher than the movement channel 111. Referring to FIG. 2, in order to avoid the above-mentioned problem, the cleaning device 100 is further provided with a sealing element 130 for connecting the movement channel 111 and the driving rod 122 in a sealed manner. In this way, the part of the driving rod 122 extending into the water tank 110 is always isolated from the water, thereby avoiding water leakage of the cleaning device 100.

The sealing element 130 has various structures, which can be a ring-shaped sealing element, which is mounted in the movement channel 111 and extends along the circumference of the movement channel 111. The sealing element is tightly fitted with the driving rod 122, so as to connect the movement channel 111 to the driving rod 122 in a sealed manner.

The sealing element 130 may also be a telescopic sealing element, and the telescopic sealing element is sleeved on the driving rod 122. One end of the telescopic sealing element is sealingly connected to the flapping plate 121, and the other end of the telescopic sealing element is sealingly connected to the surface of the inner wall of the water tank 110. In this way, the movement channel 111 is connected to the driving rod 122 in a sealed manner, and the telescopic sealing element can be deformed with the movement of the driving rod 122, thereby preventing the telescopic sealing element from affecting the normal movement of the driving rod 122.

Referring to FIG. 2, considering that the area of the mopping cloth carried by the cleaning robot is relatively large or the cleaning robot carry two or more mopping cloths, the cleaning device 100 is provided with at least two mopping cloth cleaning members 120, and the water tank 110 is provided with at least two movement channels 111 therethrough, so as to better clean the mopping cloth carried by the cleaning robot. The flapping plate 121 of each of the at least two mopping cloth cleaning members 120 is driven by the corresponding driving rod 122 to reciprocate up and down, so as to flap and clean the mopping cloth 200 of the cleaning robot.

Further, the cleaning device 100 is further provided with a driving plate 140, which is connected to the driving rod 122 of each of the at least two mopping cloth cleaning members 120. In this way, the driving rod 122 of each of the at least two mopping cloth cleaning members 120 can be driven to move up and down only by applying force to the driving plate 140, thereby driving the flapping plate 121 of each of the at least two mopping cloth cleaning members 120 to move up and down, which is convenient to drive the plurality of mopping cloth cleaning members 120 to work at the same time.

It should be noted that there are many methods to connect the driving plate 140 to the driving rod 122 of the mopping cloth cleaning member 120, and the two can be fixedly connected by other methods such as screw connection, buckle connection, and adhesion. Alternatively the driving plate 140 and the driving rod 122 are connected by plugging connection. Specifically, the surface of the driving plate 140 facing the driving rod 122 is provided with at least two plug-in posts 141. The end of the driving rod 122 away from the flapping board 121 is recessed to form a plug-in slot 122*a* that is matched with the plug-in post 141. The plugging mode has the advantage of convenient and quick disassembly and assembly, which facilitates the assembly and disassembly of the mopping cloth cleaning member and the driving plate 140.

Further, a flexible buffer material 150 is provided between the driving plate 140 and the water tank 110. The flexible buffer material 150 may be arranged on the surface of the driving plate 140 facing the water tank 110. Alternatively, the flexible buffer material 150 may be arranged on the surface of the water tank 110 facing the driving plate 140. Alternatively, the flexible buffer material 150 may be provided on the surface of the driving plate 140 facing the water tank 110 and the surface of the water tank 110 facing the driving plate 140 at the same time. The flexible buffer material 150 may be a flexible material such as shock-absorbing cotton, rubber. The arrangement of the flexible material can effectively buffer the impact of the driving plate 140 on the water tank 110 when the driving plate 140 moves, thereby avoiding noise that is generated by the rigid contact between the water tank 110 and the driving plate 140 thereby achieving the effect of silent cleaning.

It should be noted that after the mopping cloth 200 of the cleaning robot is cleaned, the dust and stains on the mopping cloth 200 of the cleaning robot are finally mixed into the water and flow into the water tank 110. In order to facilitate the discharge of the water in the water tank 110, the bottom of the water tank 110 is further provided with a discharge port 112. The cleaning device 100 further includes a valve (not shown) arranged at the discharge port 112, and the valve is configured to control the opening or closing of the discharge port 112. In this way, the sewage in the water tank 110 can be discharged only by opening the valve of the discharge port 112, thereby facilitating the cleaning of the water tank 110.

It should be mentioned that the mopping cloth cleaning member 120 can be manually driven to reciprocate up and down, and the mopping cloth cleaning member 120 can also reciprocates up and down under the driving of the driving mechanism 160. Alternatively, the mopping cloth cleaning member 120 reciprocates up and down under the driving of the driving mechanism 160. In this way, it is convenient for the user to manipulate the cleaning device 100, thereby facilitating the cleaning of the mopping cloth 200 of the cleaning robot, which is beneficial to improve the user experience.

Figure 4:
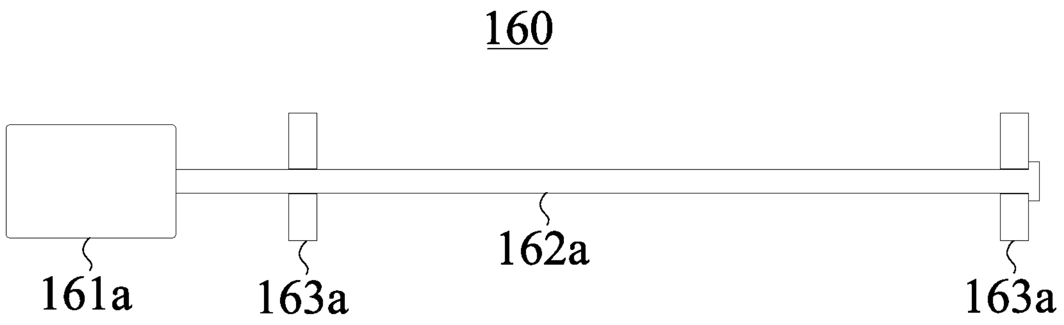
FIG. 4 is a schematic structural view of driving mechanism in FIG. 2 according to an embodiment of the present disclosure.

It should be noted that there are many types of the driving mechanism 160. The type of the driving mechanism 160 is related to the movement mode of the mopping cloth cleaning member 120. Referring to FIGS. 2 and 4, when the mopping cloth cleaning member 120 moves up and down in a straight line, the driving mechanism 160 may be composed of a driving motor 161*a*, a transmission shaft 162*a*, and a cam 163*a*. The driving motor 161*a* may be arranged on the water tank 110 or other parts of the cleaning device 100. The driving motor 161*a* is drivingly connected to the transmission shaft 162*a*. The cam 163*a* is sleeved on the transmission shaft 162*a*, and the driving motor 161*a* drives the transmission shaft 162*a* to rotate, so as to drive the mopping cloth cleaning member 120 to reciprocate up and down through the cam 163*a*.

Figure 5:
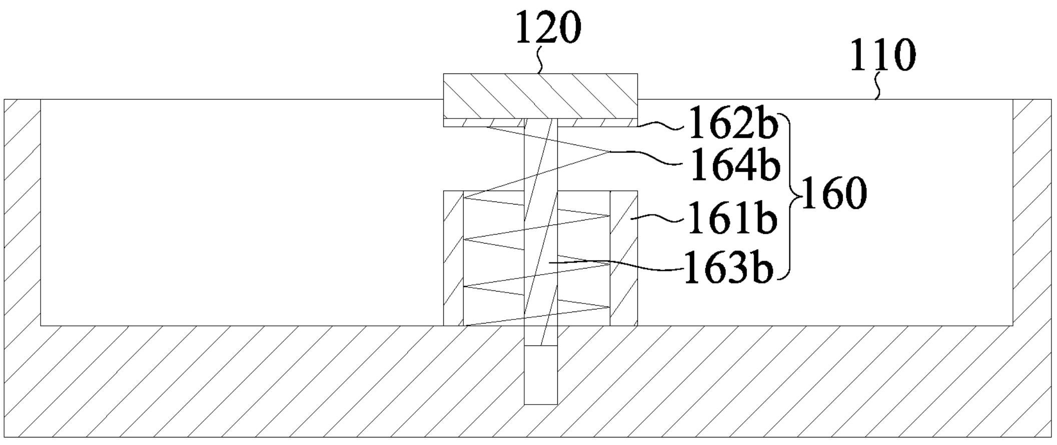
FIG. 5 is a sectional view of a cleaning device according to another embodiment of the present disclosure.

Referring to FIG. 5, the driving mechanism 160 may also be composed of an electromagnet 161*b*, an iron block 162*b*, a guide post 163*b*, and an elastic member 164*b*. One end of the guide post 163*b* is connected to the mopping cloth cleaning member, and the other end of the guide post 163*b* is matched with the guide channel provided on the water tank 110. The iron block 162*b* is arranged on the mopping cloth cleaning member 120, and the electromagnet 161*b* is arranged on the water tank 110. One end of the elastic member 164*b* is connected to the mopping cloth cleaning member 120, and the other end of the elastic member 164*b* is connected to the water tank 110. When the electromagnet 161*b* is powered on, it generates magnetism to attract the iron block 162*b*, and the elastic member 164*b* is in a compressed state and the mopping cloth cleaning member 120 is at the bottom at the time. When the electromagnet 161*b* is powered off, the iron block 162*b* is released, and the elastic member 164*b* restores its initial shape at this time. The mopping cloth cleaning member 120 moves from bottom to top. The electromagnet 161*b* is powered on and off to drive the mopping cloth cleaning member 120 to reciprocate up and down.

Obviously, the driving mechanism 160 may also be composed of other structural members which are configured to realize that the mopping cloth cleaning member 120 can move up and down in a straight line, which will not be listed one by one herein.

Figure 6:
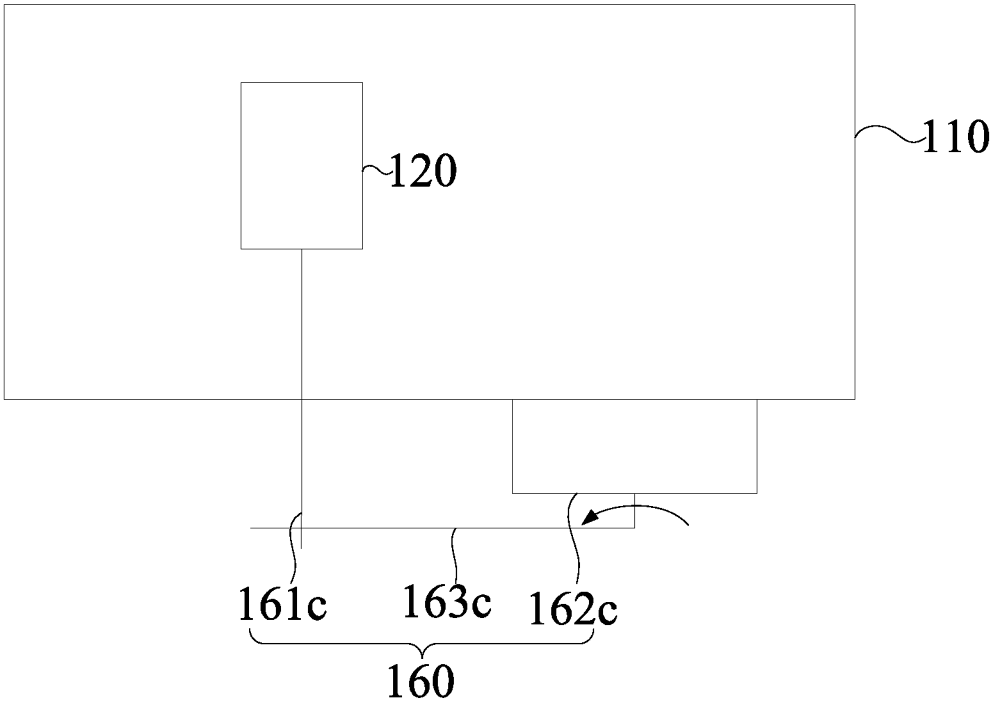
FIG. 6 is a schematic structural diagram of a cleaning device according to a further embodiment of the present disclosure.

Referring to FIG. 6, when the mopping cloth cleaning member 120 swings up and down in an arc, the driving mechanism 160 may be composed of a swinging rod 161*c*, a power motor 162*c*, and a swinging lever 163*c*. The power motor 162*c* is arranged on the water tank 110 or other components of the cleaning device 100. The swinging lever 163*c* is fixedly connected to an output shaft of the power motor 162*c*. The swinging lever 163*c* can rotates in a vertical plane under the drive of the power motor 162*c*. The middle part of the swinging rod 161*c* is hinged with the water tank 110. One end of the swinging rod 161*c* is connected to the mopping cloth cleaning member 120, and the other end of the swinging rod 161*c* is hinged with the swinging lever 163*c*. The power motor 162*c* reciprocates within a preset angle to drive the swinging lever 163*c* to drive the swinging rod 161*c* to swing up and down, thereby driving the mopping cloth cleaning member 120 to reciprocate up and down.

Figure 7:
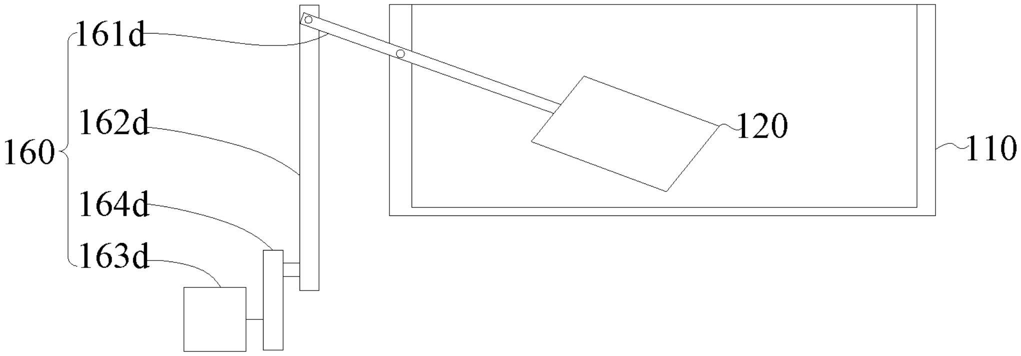
FIG. 7 is a schematic structural diagram of a cleaning device according to yet another embodiment of the present disclosure.

Referring to FIG. 7, the driving mechanism 160 may also be composed of a swinging rod 161*d*, a transmission rod 162*d*, an output motor 163*d*, and an eccentric wheel 164*d*. The output motor 163*d* is arranged on the water tank 110 or other components of the cleaning device 100. The output shaft of the output motor 163*d* extends in the horizontal direction. The eccentric wheel 164*d* is fixedly connected to the output shaft of the output motor 163*d*. The transmission rod 162*d* is connected to the eccentric wheel 164*d*. One end of the transmission rod 162*d* is hinged with the eccentric wheel 164*d*, and the other end of the transmission rod 162*d* extends along the up and down direction. A middle part of the swinging rod 161*dis* hinged with the water tank 110. One end of the swinging rod 161*d* is connected to the mopping cloth cleaning member 120, and the other end of the swinging rod 161*dis* hinged with the transmission rod 162*d*. The output motor 163*d* drives the eccentric wheel 164*d* to rotate, and the transmission rod 162*d* drives the swinging rod 161*d* to swing up and down under the drive of the eccentric wheel 164*d*, thereby driving the mopping cloth cleaning member 120 to reciprocate up and down.

Obviously, when the mopping cloth cleaning member 120 swings up and down in an arc, the driving mechanism 160 may also be composed of other structural members, which will not be listed one by one herein.

The present disclosure further provides a cleaning method of a cleaning device. The cleaning device 100 includes a water injection member, a mopping cloth cleaning member 120 and a driving mechanism 160. The water injection member, the mopping cloth cleaning member 120 and the driving mechanism 160 can refer to the above-mentioned embodiments. The cleaning method of the cleaning device 100 is specifically described below, and the specific steps of the cleaning method of the cleaning device are as follows.

Step S100: when the working duration of the driving mechanism reaches a first preset duration, the water injection member is controlled to stop wetting the mop of the cleaning robot, and the driving mechanism is controlled to work for a second preset duration to drive the mopping cloth cleaning member reciprocate up and down.

There are many ways for the cleaning device 100 to determine whether the cleaning robot is at the cleaning position. For example, the cleaning position of the cleaning robot at the cleaning device 100 can be detected by signal induction, that is, the cleaning robot is provided with an optical signal transmitter, and the cleaning device 100 is provided with an optical signal receiver. When the optical signal receiver on the cleaning device 100 receives the optical signal transmitter on the cleaning robot, it can be determined that the cleaning robot is located at the cleaning position of the cleaning device 100. For another example, the cleaning device 100 can monitor the position of the cleaning robot through a camera, and the camera transmits the real-time image of the cleaning robot captured to the processor, and the processor determines whether the cleaning robot is located at the cleaning position of the cleaning device 100 according to the image processing result. How to determine that the cleaning robot is at the cleaning position of the cleaning device 100 will not be listed one by one herein.

There are many ways for the water injection member to wet the mopping cloth of the cleaning robot. The water injection member can directly spray water to the mopping cloth of the cleaning robot to wet the mopping cloth of the cleaning robot. The water injection member can also spray water to the mopping cloth cleaning member 120, and the mopping cloth cleaning member 120 reciprocates to wet the mopping cloth of the cleaning robot, which is not specifically limited herein.

The type of the driving mechanism 160 has been described in detail in the foregoing embodiments, and will not be repeated herein. The driving mechanism 160 can drive the mopping cloth cleaning member 120 to reciprocate up and down many times to realize the cleaning of the mopping cloth 200 of the cleaning robot.

In some embodiments of the present disclosure, the cleaning method of the cleaning device further includes the following step. When the working duration of the driving mechanism reaches the first preset duration, the water injection member is controlled to stop wetting the mopping cloth of the cleaning robot, and the driving mechanism is controlled to work for the second preset duration, to drive the mopping cloth cleaning member to reciprocate up and down.

The working duration of the driving mechanism 160 can be determined by detecting the power-on duration of the driving mechanism 160. The first preset duration can be set according to the cleanliness of the mopping cloth 200 of the cleaning robot. If the mopping cloth 200 of the cleaning robot is very dirty, the first preset duration can be set to be longer, such as 10-15 minutes. If the mopping cloth 200 of the cleaning robot is not very dirty, the first preset duration can be set to be shorter, such as 5-8 minutes. How to set the first preset duration can be adjusted according to actual conditions, which is not specifically limited herein.

The second preset duration is set according to the water absorption performance of the mopping cloth 200 of the cleaning robot. If the water absorption performance of the mopping cloth 200 of the cleaning robot is good, the second preset duration period can be set longer, such as 5-8 minutes. If the water absorption performance of the mopping cloth 200 of the cleaning robot is relatively poor, the second preset duration can be set shorter, such as 1-3 minutes. How to set the second preset duration can be adjusted according to the actual situation, which is not specifically limited here.

There are many ways for the water injection member to stop wetting the mopping cloth of the cleaning robot. If the water injection member is a water tank, the mopping cloth of the cleaning robot can be stopped wetting by draining the water in the sink. If the water injection member is a sprayer, the mopping cloth of the cleaning robot can be stopped wetting by stopping providing water to the sprayer. The specific ways are not listed herein one by one.

In the cleaning method of the cleaning device 100 of the present disclosure, the cleaning water is added to the water tank 110, and the driving mechanism 160 drives the mopping cloth cleaning member 120 to reciprocate between the first position and the second position, so as to clean the mopping cloth 200 of the cleaning robot in the form of flapping. At the same time, after completing the cleaning process of the mopping cloth 200 of the cleaning robot, the mopping cloth cleaning member 120 can also reciprocate between the first position and the second position to flap the mopping cloth 200 of the cleaning robot, to squeeze out excess water from the mopping cloth 200 of the cleaning robot, which is beneficial to accelerate the dewatering of the mopping cloth 200 of the cleaning robot.

Referring to FIG. 1, the present disclosure further provides a cleaning machine system 1000, and the cleaning machine system 1000 includes a cleaning robot and a cleaning device 100. The cleaning device 100 is configured to clean the mopping cloth 200 of the cleaning robot. The detail of the cleaning device refers to the foregoing embodiment. Since the cleaning machine system 1000 adopts the technical solutions of the foregoing embodiments, it has the beneficial effects brought about by the technical solutions of the foregoing embodiments, which will not be repeated one by one herein.

Described above are only the exemplary embodiments of the present disclosure, and do not limit the scope of the present disclosure. Under the inventive concept of the present disclosure, equivalent structural transformations made by using the contents of the description and drawings of the present disclosure, or direct/indirect use in all other related technical fields are included in the scope of patent protection of the present disclosure.

What is claimed is:

1. A cleaning device, for cleaning a mopping cloth of a cleaning robot, comprising:

a water injection member comprises a water tank with an opening at an upper end;

at least one mopping cloth cleaning member is a movable plate member mounted on the water tank and comprises a driving rod capable of reciprocating movement;

wherein there is a first position where the at least one mopping cloth cleaning member extends into the water tank and a second position where the at least one mopping cloth cleaning member extends out of the water tank and flaps the mopping cloth of the cleaning robot, and the at least one mopping cloth cleaning member reciprocates bath and forth between the first position and the second position to clean the mopping cloth of the cleaning robot;

the movable plate member further comprises a flapping plate, wherein a surface of the flapping plate is smaller than an area of the opening of the water tank, and wherein the flapping plate is driven by an external force to move up and down;

the water tank is provided with at least one movement channel throughout the water tank;

an end of the driving rod is connected to the flapping plate, and another end of the driving rod passes through the at least one movement channel;

the cleaning device further comprises a sealing element configured to sealingly connect the at least one movement channel to the driving rod; and the cleaning device further comprises a telescopic sealing element sleeved on the driving rod, wherein one end of the telescopic sealing element is sealingly connected to the flapping plate, and another end of the telescopic sealing element is sealingly connected to a surface of an inner wall of the water tank.

2. The cleaning device of claim 1, wherein the water tank is provided with at least a second movement channels through the water tank;

wherein the cleaning device comprises at least a second mopping cloth cleaning member, and the driving rod of a corresponding mopping cloth cleaning member is correspondingly fit with a corresponding movement channel, and wherein the cleaning device further comprises a driving plate arranged outside the water tank and connected to the driving rod of each corresponding mopping cloth cleaning member.

3. The cleaning device of claim 2, wherein a surface of the driving plate facing the driving rod is provided with at least two plug-in posts, and an end of each driving rod away from the flapping plate is recessed to form a plug-in slot that fits with the plug-in post.

4. The cleaning device of claim 2, wherein a flexible buffer material is arranged between the driving plate and the water tank.

5. The cleaning device of claim 1, wherein a bottom of the water tank is provided with a discharge port throughout the water tank, wherein the cleaning device further comprises a valve mounted at the discharge port, and the valve is configured to control the discharge port to open or close.

6. The cleaning device of claim 1, wherein the cleaning device further comprises a driving mechanism which acts on the at least one mopping cloth cleaning member and drives the at least one mopping cloth cleaning member to reciprocate up and down.

7. The cleaning device of claim 6, wherein the driving mechanism comprises:

a transmission shaft;

a driving motor drivingly connected to the transmission shaft; and a cam sleeved on the transmission shaft, wherein the driving motor drives the transmission shaft to rotate, so as to drive the at least one mopping cloth cleaning member to reciprocate up and down through the cam.

8. The cleaning device of claim 6, wherein the driving mechanism comprises:

an electromagnet arranged on the water tank;

an iron block arranged on the at least one mopping cloth cleaning member;

a guide post, one end of which is connected to the at least one mopping cloth cleaning member, and another end of which is matched with a guide channel provided on the water tank; and an elastic member, one end of which is connected to the at least one mopping cloth cleaning member, and another end of which is connected to the water tank.

9. The cleaning device of claim 6, wherein the driving mechanism comprises:

a power motor arranged on the water tank;

a swinging lever fixedly connected to an output shaft of the power motor and rotating in a vertical plane under the drive of the power motor; and a swinging rod, one end of which is connected to the at least one mopping cloth cleaning member, and another end of which is hinged with the swinging lever.

10. The cleaning device of claim 6, wherein the driving mechanism comprises:

an output motor arranged on the water tank;

an eccentric wheel fixedly connected to an output shaft of the output motor;

a transmission rod connected to the eccentric wheel; and a swinging rod, a middle part of which is hinged with the water tank, and one end of which is connected to the at least one mopping cloth cleaning member, and another end of which is hinged with the transmission rod.

11. A cleaning method for a cleaning device, wherein the cleaning device comprises a water injection member configured to wet a mopping cloth of the cleaning robot, and a mopping cloth cleaning member reciprocating up and down to flap the mopping cloth of the cleaning robot, in order to clean the mopping cloth of the cleaning robot;

wherein the water injection member comprises a water tank with an opening at an upper end;

the mopping cloth cleaning member is a movable plate member mounted on the water tank and comprises a driving rod capable of reciprocating movement;

wherein there is a first position where the mopping cloth cleaning member extends into the water tank and a second position where the mopping cloth cleaning member extends out of the water tank and flaps the mopping cloth of the cleaning robot, and the mopping cloth cleaning member reciprocates back and forth between the first position and the second position to clean the mopping cloth of the cleaning robot;

the movable plate member further comprises a flapping plate, wherein a surface area of the flapping plate is smaller than an area of the opening of the water tank, and wherein the flapping plate is driven by an external force to move up and down;

the water tank is provided with a movement channel throughout the water tank;

an end of the driving rod is connected to the flapping plate, and another end of the driving rod passes through the movement channel;

the cleaning device further comprises a sealing element configured to sealingly connect the movement channel to the driving rod; and the cleaning device further comprises a telescopic sealing element sleeved on the driving rod, wherein one end of the telescopic sealing element is sealingly connected to the flapping plate, and another end of the telescopic sealing element is sealingly connected to a surface of an inner wall of the water tank;

wherein the cleaning method comprises:

supplying water to the water injection member to wet the mopping cloth of the cleaning robot, when the cleaning robot is at a cleaning position of the cleaning device, and activating a driving mechanism to drive the mopping cloth cleaning member to reciprocate up and down.

12. The cleaning method for the cleaning device of claim 11, further comprising:

controlling the water injection member to stop wetting the mopping cloth of the cleaning robot, when a working duration of the driving mechanism reaches a first preset duration; and controlling the driving mechanism to work for a second preset duration, so as to drive the mopping cloth cleaning member to reciprocate up and down.

13. A cleaning machine system, comprising:

a cleaning robot; and a cleaning device comprising:

a water injection member comprises a water tank with an opening at an upper end;

a mopping cloth cleaning member is a movable plate member mounted on the water tank and comprises a driving rod capable of reciprocating movement, wherein there is a first position where the mopping cloth cleaning member extends into the water tank and a second position where the mopping cloth cleaning member extends out of the water tank and flaps a mopping cloth of the cleaning robot, and the mopping cloth cleaning member reciprocates back and forth between the first position and the second position to clean the mopping cloth of the cleaning robot;

the movable plate member further comprises a flapping plate, wherein a surface area of the flapping plate is smaller than an area of the opening of the water tank, and wherein the flapping plate is driven by an external force to move up and down;

the water tank is provided with a movement channel throughout the water tank;

an end of the driving rod is connected to the flapping plate, and another end of the driving rod passes through the movement channel;

the cleaning device further comprises a sealing element configured to sealingly connect the movement channel to the driving rod; and the cleaning device further comprises a telescopic sealing element sleeved on the driving rod, wherein one end of the telescopic sealing element is sealingly connected to the flapping plate, and another end of the telescopic sealing element is sealingly connected to a surface of an inner wall of the water tank.

* * * * *